United States Patent
Han et al.

(10) Patent No.: US 10,181,330 B2
(45) Date of Patent: Jan. 15, 2019

(54) SIGNAL PROCESSING METHOD AND DEVICE

(71) Applicant: ZTE Corporation, Shenzhen (CN)

(72) Inventors: Na Han, Shenzhen (CN); Hao Yuan, Shenzhen (CN); Dongmei Huang, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 0 days.

(21) Appl. No.: 15/526,812

(22) PCT Filed: Jul. 15, 2015

(86) PCT No.: PCT/CN2015/084148
§ 371 (c)(1),
(2) Date: May 15, 2017

(87) PCT Pub. No.: WO2016/074495
PCT Pub. Date: May 19, 2016

(65) Prior Publication Data
US 2017/0337936 A1    Nov. 23, 2017

(30) Foreign Application Priority Data
Nov. 14, 2014    (CN) .......................... 2014 1 0649621

(51) Int. Cl.
*G10L 21/0272*    (2013.01)
*G01S 5/20*    (2006.01)
(Continued)

(52) U.S. Cl.
CPC ........ *G10L 21/0272* (2013.01); *G01S 3/8055* (2013.01); *G01S 5/20* (2013.01);
(Continued)

(58) Field of Classification Search
CPC ...... H04R 3/00; H04R 3/005; H04R 2430/23; G10L 2021/02166
(Continued)

(56) References Cited

U.S. PATENT DOCUMENTS 9,173,025 B2 * 10/2015 Dickins ................. H04R 3/002
9,432,769 B1 *  8/2016 Sundaram ............. H04R 3/005
(Continued)

FOREIGN PATENT DOCUMENTS

CN          1866356 A     11/2006
CN        103308889 A      9/2013
(Continued)

OTHER PUBLICATIONS

International Search Report for corresponding application PCT/CN2015/084148 filed on Jul. 15, 2015; dated Sep. 24, 2015.
European Search Report for corresponding application EP15859302; Report dated Nov. 22, 2017.

*Primary Examiner* — Disler Paul
(74) *Attorney, Agent, or Firm* — Cantor Colburn LLP

(57) ABSTRACT

A signal processing method and device are provided. At least two channel sound signals are acquired, and a frequency-domain audio signal corresponding to each channel sound signal is acquired; beam forming output signals of a beam group corresponding to an audio signal of each frequency point are acquired; an output direction of the beam group is acquired; and time-domain sound signals output after beam forming in the output direction are acquired.

17 Claims, 4 Drawing Sheets

(51) Int. Cl.
*G10L 21/0216* (2013.01)
*H04R 3/00* (2006.01)
*G01S 3/805* (2006.01)
*G10L 21/0316* (2013.01)

(52) U.S. Cl.
CPC .......... *G10L 21/0216* (2013.01); *H04R 3/005* (2013.01); *G10L 21/0316* (2013.01)

(58) Field of Classification Search
USPC ..................................................... 381/91–92
See application file for complete search history.

(56) References Cited

U.S. PATENT DOCUMENTS

| | | | |
|---|---|---|---|
| 2006/0215854 A1 | 9/2006 | Suzuki | |
| 2008/0240463 A1 | 10/2008 | Florencio | |
| 2009/0296526 A1 | 12/2009 | Amada | |
| 2012/0183149 A1 | 7/2012 | Hiroe | |
| 2015/0163577 A1* | 6/2015 | Benesty | H04R 1/406 |
| | | | 381/92 |
| 2017/0337932 A1* | 11/2017 | Iyengar | G10L 21/0208 |

FOREIGN PATENT DOCUMENTS

| | | |
|---|---|---|
| CN | 103513249 A | 1/2014 |
| CN | 104103277 A | 10/2014 |
| EP | 1992959 A2 | 11/2008 |

\* cited by examiner

SIGNAL PROCESSING METHOD AND DEVICE

TECHNICAL FIELD

The present disclosure relates to the field of signal processing, and more particularly to a signal processing method and device.

BACKGROUND

The most common microphone-array-based speech enhancement method utilizes a beam forming characteristic of an array. According to different implementation manners, existing beam forming technologies may be divided into Delay and Sum Beam Forming (DSBF) and adaptive beam forming technologies. The DSBF method proposed by Flanagan in 1985 is the simplest DSBF method. At first, time compensation is performed on a speech signal received on each microphone in an array to implement speech synchronization of each channel, and then the signal of each channel is added and averaged. Under such a condition, once the signals are deviated from a direction of the array, the array may provide different gains for signals of different frequencies, thereby causing processing distortion of the bandwidth signals.

The other type of beam forming technology corresponding to the DSBF technology is adaptive beam forming technology. The adaptive characteristic of the adaptive beam forming technology is reflected in variation of a filter coefficient along with variation of a statistical characteristic of an input signal. A Generalized Sidelobe Canceller (GSC) proposed by Griffth and Jim in 1982 is a universal model of an adaptive beam former. However, in a GSC algorithm, output of a Block Matrix (BM) usually includes an effective speech component, so that an original speech may be damaged in a filter result.

SUMMARY

Some embodiments of the present disclosure provide a signal processing method and device, so as to mainly solve the problem of distortion of a bandwidth signal during microphone-array-based speech enhancement in a related signal processing technology.

In order to achieve the purpose, an embodiment of the present disclosure provides a signal processing method, which may include the following acts.

At least two channel sound signals are acquired, and Short-Time Fourier Transform (STFT) is performed on each channel sound signal to acquire a frequency-domain audio signal corresponding to each channel sound signal.

Beam forming output signals of a beam group corresponding to an audio signal of each frequency point are acquired according to preset weight vectors of multiple directions and the frequency-domain audio signal corresponding to each channel sound signal.

An output direction of the beam group is acquired according to beam energy of different frequency points in same directions.

Time-domain sound signals output after beam forming in the output direction are acquired.

In an embodiment of the present disclosure, the act that the beam forming output signals of the beam group corresponding to the audio signal of each frequency point are acquired according to the preset weight vectors of the multiple directions and the frequency-domain audio signal corresponding to each channel sound signal may include the following acts.

According to the preset weight vectors of the multiple directions, frequency-domain audio signals corresponding to all or part of the at least two channel sound signals are selected and the beam forming output signals of the beam group corresponding to the audio signal of each frequency point are acquired.

In an embodiment of the present disclosure, the act that the output direction of the beam group is acquired according to the beam energy of different frequency points in the same directions may include the following acts.

The beam energy of different frequency points in the same directions is summated, and a direction with maximum beam energy is selected as the output direction.

In an embodiment of the present disclosure, the acts that the beam energy of different frequency points in the same directions is summated and the direction with the maximum beam energy is selected as the output direction may include the following acts.

The beam energy of all frequency points between a preset first frequency and a preset second frequency in the same directions is summated, and the direction with the maximum beam energy is selected as the output direction.

In the present disclosure, the preset weight vectors of the multiple directions may be obtained based on a DSBF algorithm, a linearly constrained minimum variance beam forming algorithm, a GSC beam forming algorithm or a Minimum Variance Distortionless Response (MVDR) method.

In an embodiment of the present disclosure, after the act that the output direction of the beam group is acquired according to the beam energy of different frequency points in the same directions, the method may further include the following act.

An audio signal, output after beam forming in the output direction, of each frequency point is multiplied by a gain, the gain having a directly proportional relationship with a frequency-domain value.

In an embodiment of the present disclosure, the gain may have different directly proportional relationships with the frequency-domain value within different preset frequency-domain value ranges.

In order to achieve the purpose, another embodiment of the present disclosure provides a signal processing device, which may include:

an STFT unit, arranged to acquire at least two channel sound signals, and perform STFT on each channel sound signal to acquire a frequency-domain audio signal corresponding to each channel sound signal;

a first acquisition unit, arranged to acquire beam forming output signals of a beam group corresponding to an audio signal of each frequency point according to preset weight vectors of multiple directions and the frequency-domain audio signal corresponding to each channel sound signal;

a second acquisition unit, arranged to acquire an output direction of the beam group according to beam energy of different frequency points in same directions; and an inverse transform unit, arranged to acquire time-domain sound signals output after beam forming in the output direction.

In an embodiment of the present disclosure, the first acquisition unit may be arranged to:

according to the preset weight vectors of the multiple directions, select frequency-domain audio signals corresponding to all or part of the at least two channel sound signals and acquire the beam forming output signals of the beam group corresponding to the audio signal of each frequency point.

In an embodiment of the present disclosure, the second acquisition unit may further be arranged to:

summate the beam energy of different frequency points in the same directions, and select a direction with maximum beam energy as the output direction.

In an embodiment of the present disclosure, the second acquisition unit may further be arranged to:

summate the beam energy of all frequency points between a preset first frequency and a preset second frequency in the same directions, and select the direction with the maximum beam energy as the output direction.

In the present disclosure, the preset weight vectors of the multiple directions may be obtained based on a DSBF algorithm, a linearly constrained minimum variance beam forming algorithm, a GSC beam forming algorithm or an MVDR method.

In an embodiment of the present disclosure, the device may further include a gain unit, arranged to multiply an audio signal, output after beam forming in the output direction, of each frequency point by a gain, the gain having a directly proportional relationship with a frequency-domain value.

In an embodiment of the present disclosure, the gain may have different directly proportional relationships with the frequency-domain value within different preset frequency-domain value ranges.

According to the embodiments of the present disclosure, the at least two channel sound signals are acquired, and STFT is performed on each channel sound signal to acquire the frequency-domain audio signal corresponding to each channel sound signal; the beam forming output signals of the beam group corresponding to the audio signal of each frequency point are acquired according to the preset weight vectors of the multiple directions and the frequency-domain audio signal corresponding to each channel sound signal; the output direction of the beam group is acquired according to the beam energy of different frequency points in the same directions; and the time-domain sound signals output after beam forming in the output direction are acquired. In the technical solution provided by the embodiments of the present disclosure, a frequency-domain-based wideband beam forming algorithm is adopted to effectively improve a gain of a received speech, a manner of adaptively selecting an optimal beam is adopted to avoid provision of prior information such as an arrival direction of an expected signal, reduce algorithm complexity and widen an application range of the algorithm. The adopted frequency-domain beam forming algorithm is favorable for fine regulation of a signal spectrum, and is conveniently integrated with other pre-processing or post-processing algorithms, and in addition, the present disclosure is easy to implement, small in calculation amount and applicable to various embedded platforms.

Achievement of the purpose, function characteristics and advantages of the present disclosure will be further described with reference to embodiments and the drawings.

DETAILED DESCRIPTION OF THE EMBODIMENTS

It should be understood that specific embodiments described here are only adopted to explain the present disclosure and not intended to limit the present disclosure.

Some embodiments of the present disclosure provide a signal processing method.

First Embodiment

Figure 1:
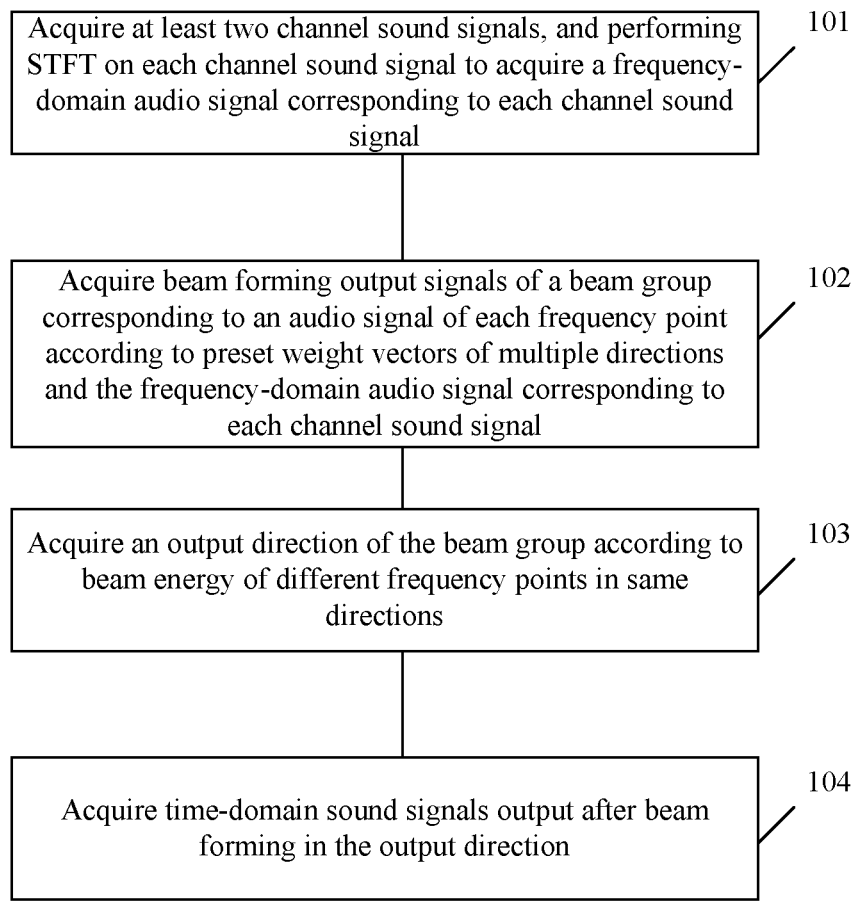
FIG. 1 is a flowchart of a signal processing method according to a first embodiment of the present disclosure.

Referring to FIG. 1, FIG. 1 is a flowchart of a signal processing method according to a first embodiment of the present disclosure.

In the first embodiment, the signal processing method includes the following acts.

At act 101, at least two channel sound signals are acquired, and STFT is performed on each channel sound signal to acquire a frequency-domain audio signal corresponding to each channel sound signal.

Specifically, sound signals of N microphones (N>=2) are acquired, and STFT is performed on the time-domain signal received by each microphone to obtain data of each frequency point of the signal received by the microphone.

STFT may be performed on the signal of each microphone by adopting the same framing method. Frames may be partially superimposed. There are multiple superimposition manners, for example, a manner of ¼ frame shift is adopted for framing in the embodiment, and of course, another manner such as ½ frame shift may also be adopted. The frame signal $s_n(i)$ of the nth microphone is multiplied by a window function $w(i)$, for example, a hamming window being used in the embodiment, to obtain a widowed frame signal $x_n(i)$. Then, STFT is performed on the windowed frame signal to obtain frequency-domain frame data, i.e.:

$$X_n(f) = fft(x_n(i)) \qquad (1)$$

where i=1, . . . , L, L is a length of the frame data and f is a frequency point.

At act 102, beam forming output signals of a beam group corresponding to an audio signal of each frequency point are acquired according to preset weight vectors of multiple directions and the frequency-domain audio signal corresponding to each channel sound signal.

Specifically, a beam group is designed, including M beams pointing to M directions respectively: $\theta_1, \theta_2, \ldots, \theta_M$, and beam forming is performed on each beam by virtue of all array elements in a microphone array. Main lobes of adjacent beams are intersected, and the main lobes of the beam group cover a required spatial range. Therefore, no matter which direction a sound source comes from, there is a certain beam with a direction close to the direction of the sound source.

Corresponding frequency-domain frame data after formation of the M beams is obtained according to weight vectors of the M different directions. A specific method as follows may be adopted. For a specific direction $\theta_m$ in the M different directions, weighted summation is performed on received data of each microphone in the microphone array at the same frequency point f to obtain weighted synthetic data $Y_m(f)$ of the mth beam at the frequency point by virtue of the preset weight vectors of the M different directions:

$$Y_m(f) = \sum_{n=1}^{N} W_{m,n}^*(f) X_n(f) = W_m^H X \tag{2}$$

where $W_{m,n}(f)$ is a weight applied to the data received by the nth microphone in the mth beam at the frequency point f, m=1, . . . , M, * represents conjugation, H represents conjugate transpose, and X and $W_m$ are vector representation forms of $X_n(f)$ and $W_{m,n}(f)$ respectively.

In an embodiment of the present disclosure, the act of acquiring the beam forming output signals of the beam group corresponding to the audio signal of each frequency point according to the preset weight vectors of the multiple directions and the frequency-domain audio signal corresponding to each channel sound signal may include the following acts.

According to the preset weight vectors of the multiple directions, frequency-domain audio signals corresponding to all or part of the at least two channel sound signals are selected and the beam forming output signals of the beam group corresponding to the audio signal of each frequency point are acquired.

Figure 2:
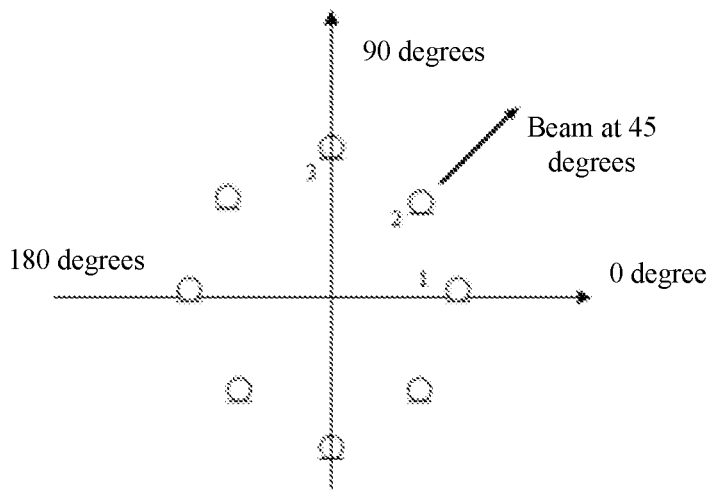
FIG. 2 is a schematic diagram of a beam forming method according to an embodiment of the present disclosure.

Specifically, due to influence of a topological structure of the microphone array, a beam forming effect achieved by virtue of part of subarrays in the microphone array may be very close to a beam forming effect achieved by virtue of all the array elements. The same performance effect may be achieved by a relatively small calculation amount. As shown in FIG. 2, FIG. 2 is a schematic diagram of a beam forming method according to an embodiment of the present disclosure. A round microphone array formed by 8 directional microphones is shown. In the embodiment, the microphone closest to a direction of an expected signal and adjacent microphones of this microphone may be selected to form a subarray for beam forming. For example, the expected signal is a beam in a 45-degree direction, and the microphone 2 dead against the 45-degree direction and adjacent microphones of this microphone 1 and 3 may be selected to form a subarray for beam forming.

A beam group is designed, including 8 beams pointing to 8 directions respectively: 0 degree, 45 degrees, 90 degrees, 135 degrees, 180 degrees, 225 degrees, 270 degrees and 315 degrees. Main lobes of adjacent beams are intersected, and the main lobes of the all the beams are superimposed to cover a range of 360 degrees. Therefore, no matter which direction a sound source comes from, there is a certain beam with a direction close to the direction of the sound source.

At act 103, an output direction of the beam group is acquired according to beam energy of different frequency points in same directions.

In an embodiment of the present disclosure, the act of acquiring the output direction of the beam group according to the beam energy of different frequency points in the same directions may include the following acts.

The beam energy of different frequency points in the same directions is summated, and a direction with maximum beam energy is selected as the output direction.

Figure 3:
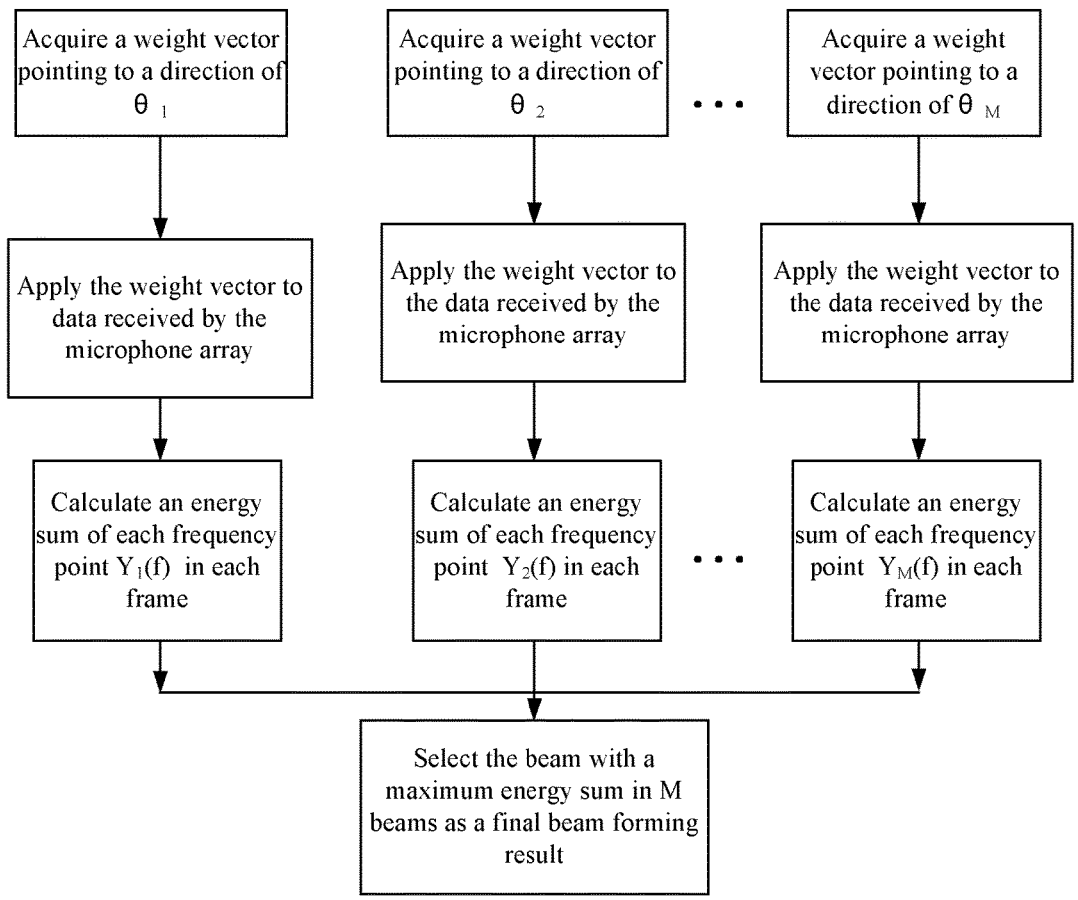
FIG. 3 is a detailed flowchart of act 103.

Specifically, FIG. 3 is a detailed flowchart of act 103. Energy of the M pieces of frequency-domain frame data is calculated by virtue of the weighted synthetic data $Y_m(f)$ obtained in act 102 respectively. A calculation formula is as follows.

$$E_m = \sum_{f=f_s/L}^{f_s/2} Y_m(f) \times Y_m^H(f) \tag{3}$$

where $f_s$ is a sampling rate, and then the beam with a maximum energy value $E_m$ is selected as a final beam forming result. Therefore, the beam closest to the direction of the sound source is adaptively selected to achieve optimal sound quality.

In an embodiment of the present disclosure, the acts of summating the beam energy of different frequency points in the same directions and selecting the direction with the maximum beam energy as the output direction may include the following acts.

The beam energy of all frequency points between a preset first frequency and a preset second frequency in the same directions is summated, and the direction with the maximum beam energy is selected as the output direction.

Specifically, for reducing the calculation amount and maintaining selection accuracy, an optimal output beam may be selected according to an energy sum of part of the frequency points. A specific implementation flow is shown in FIG. 3. Energy sums of the frequency-domain frame data corresponding to the M directions are calculated by virtue of the weighted synthetic data $Y_m(f)$ obtained in act 102 respectively. A calculation formula is as follows.

$$E_m = \sum_{f=f_1}^{f_2} Y_m(f) \times Y_m^H(f) \tag{4}$$

where $0<f_1<f_2<f_s/2$, and for example, when a Fast Fourier Transform (FFT) length L is 256, $f_1=f_s/8$ and $f^2=f_s/2$. An energy sum from frequency points $f_1$ to $f_2$ is calculated here. Then, the beam with the maximum energy value E is selected as the final beam forming result. Adopting the manner may avoid low-frequency signal distortion.

The preset weight vectors of the multiple directions may be obtained based on a DSBF algorithm, a linearly constrained minimum variance beam forming algorithm, a GSC beam forming algorithm or a Minimum Variance Distortionless Response (MVDR) method.

Specifically, detailed descriptions are made in the embodiment with an MVDR beam forming filter as an example.

The MVDR method is to minimize power of the output signals to obtain an estimate about an optimal beam former weight vector. Power spectral densities of the output signals are as follows.

$$\Phi_{YY} = W^H \Phi_{XX} W \tag{5}$$

where $\Phi_{XX}$ represents a power spectral density matrix of the input signals of the array.

In an optimization process, it is suggested to ensure that the signals in the expected direction are distortionless, that is:

$$W^H d = 1 \tag{6}$$

where d represents attenuation and delay caused by signal propagation, and is calculated as follows.

$$d = [\alpha_0 e^{-j\Omega\tau_0}, \alpha_1 e^{-j\Omega\tau_1}, \ldots, \alpha_N e^{-j\Omega\tau_N}] \quad (7)$$

Figure 4:
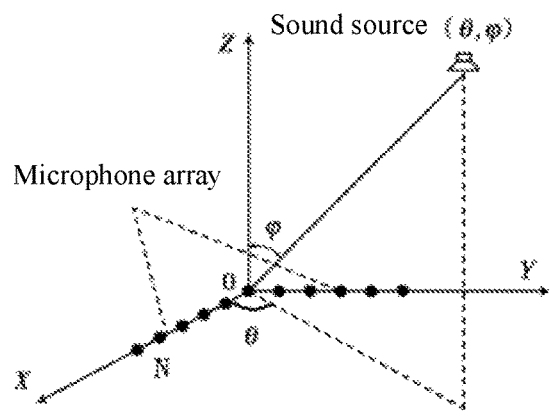
FIG. 4 is a schematic diagram of an L-shaped three-dimensional spatial microphone array according to an embodiment of the present disclosure.

If a far field model is used, amplitude differences of the signal received by each array element may be neglected, attenuation factors $\alpha_n$ are all set to be 1, $\Omega$ is an angular frequency, and $\tau_n$ is a time difference between two array elements in the space:

$$\tau_n = \frac{f_s}{c} \times (l_{x,n}\cos(\theta)\sin(\varphi) + l_{y,n}\sin(\theta)\sin(\varphi) + l_{z,n}\cos(\varphi)) \quad (8)$$

where $f_s$ is a signal sampling rate, c is a sound velocity 340 m/s, $l_{x,n}$ is a component of a spacing distance between the nth array element and a reference array element in a direction of an x axis, $l_{y,n}$ is a component in a direction of a y axis, $l_{z,n}$ is a component in a direction of a z axis, $\theta$ is an included angle between a projection of an incident signal in an xy plane and the x axis, and $\varphi$ is an included angle between the incident signal and the z axis. FIG. 4 is a schematic diagram of an L-shaped three-dimensional spatial microphone array according to an embodiment of the present disclosure. Formula (4) is applicable to a microphone array of any topological structure.

Then, the beam former is converted into a problem of resolving constrained optimization:

$$\min_W W^H \Phi_{XX} W \quad \text{s.t.} \quad W^H d = 1 \quad (9)$$

Since only optimal noise suppression is concerned, if the direction of the expected signal is completely consistent with the direction of the array, an MVDR filter may be obtained only by virtue of a power spectral density matrix of noise:

$$W_{MVDR} = \frac{\Phi_{VV}^{-1} d}{d^H \Phi_{VV}^{-1} d} \quad (10)$$

where $\Phi_{vv}$ is the power spectral density matrix of the noise. If the matrix is a coherent matrix, a super-directional beam former is obtained as the frequency-domain weight vector used in act 102:

$$W_{MVDR} = \frac{\Gamma_{vv}^{-1} \times d}{d^H \times \Gamma_{vv}^{-1} \times d} \quad (11)$$

$\Gamma_{vv}$ is a coherent function matrix of the noise. Elements in the pth row and the qth column are calculated by the following formula:

$$\Gamma V_p V_q(e^{j\Omega}) = \text{sin } c(\Omega \times f_s \times l_{pq}/c) \quad (12)$$

where $l_{pq}$ is a spacing distance between array elements p and q.

At act 104, acquiring time-domain sound signals output after beam forming in the output direction.

Specifically, inverse STFT is performed on the weighted synthetic frame data Y(f) of all the frequency points f to obtain weighted time-domain frame data y(i), i=1, . . . , L.

Then, windowing and superimposition processing is performed on the time-domain frame data to obtain final time-domain data.

A window function is applied to an inverse STFT result to obtain an intermediate result:

$$y'(i) = y(i) \cdot w(i), 1 \leq i \leq L \quad (13)$$

Due to adoption of ¼ frame shift, it is suggested to perform superimposition processing on data of 4 frames. Signals of frames j-3, j-2, j-1 and j to which results calculated by the above formula belong are superimposed to obtain a time-domain signal $z_j(i)$ of the jth frame (the length is L/4):

$$zj(i) = y'_{j-3}(i + 3 \cdot L/4) + y'_{j-2}(i + L/2) + y'_{j-1}(i + L/4) + y'_j(i),$$
$$1 \leq i \leq L/4 \quad (14)$$

According to the embodiment of the present disclosure, the at least two channel sound signals are acquired, and STFT is performed on each channel sound signal to acquire the frequency-domain audio signal corresponding to each channel sound signal; the beam forming output signals of the beam group corresponding to the audio signal of each frequency point are acquired according to the preset weight vectors of the multiple directions and the frequency-domain audio signal corresponding to each channel sound signal; the output direction of the beam group is acquired according to the beam energy of different frequency points in the same directions; and the time-domain sound signals output after beam forming in the output direction are acquired. In the present disclosure, a frequency-domain-based wideband beam forming algorithm is adopted to effectively improve a gain of a received speech, a manner of adaptively selecting an optimal beam is adopted to avoid provision of prior information such as an arrival direction of an expected signal, reduce algorithm complexity and widen an application range of the algorithm. The adopted frequency-domain beam forming algorithm is favorable for fine regulation of a signal spectrum, and is conveniently integrated with other pre-processing or post-processing algorithms, and in addition, the present disclosure is easy to implement, small in calculation amount and applicable to various embedded platforms.

Second Embodiment

Figure 5:
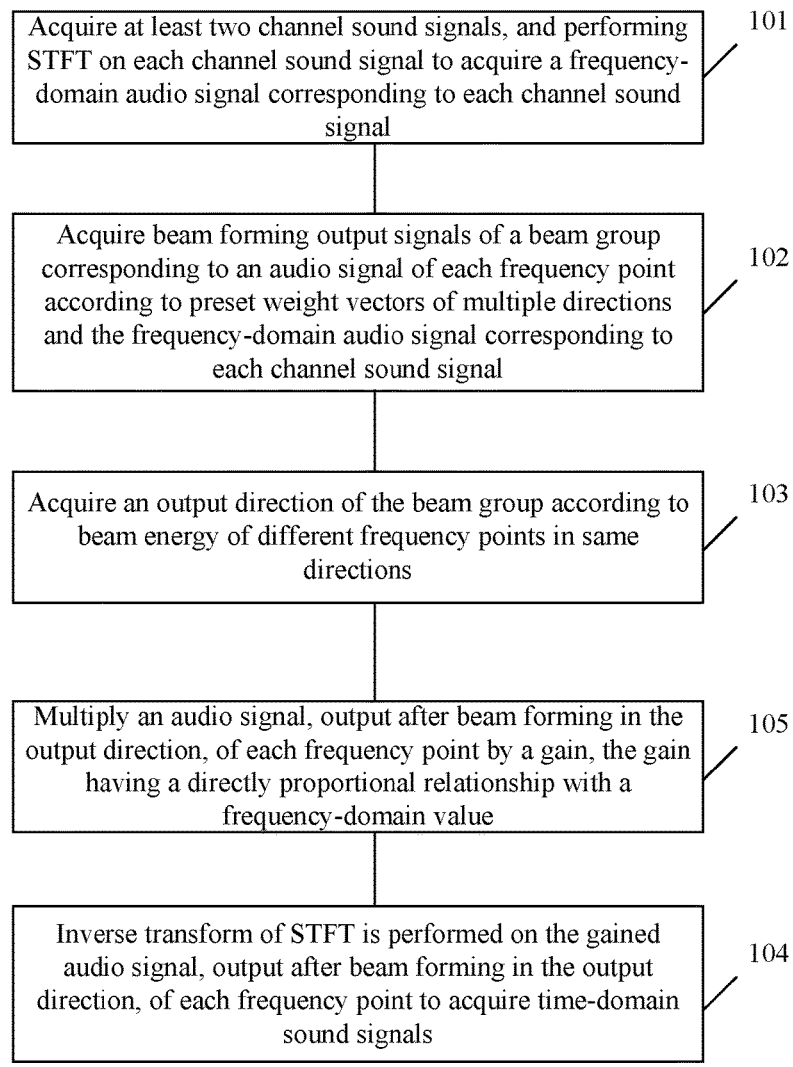
FIG. 5 is a flowchart of a signal processing method according to a second embodiment of the present disclosure.
Figure 6:
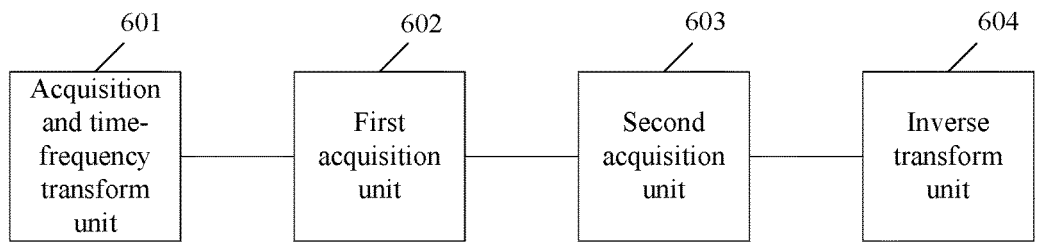
FIG. 6 is a schematic diagram of function modules of a signal processing device according to a first embodiment of the present disclosure.

Referring to FIG. 5, FIG. 5 is a flowchart of a signal processing method according to a second embodiment of the present disclosure.

On the basis of the first embodiment, after act 103, act 105 is further included.

At act 105, an audio signal, output after beam forming in the output direction, of each frequency point is multiplied by a gain, the gain having a directly proportional relationship with a frequency-domain value.

Specifically, in wideband beams, it is also necessary to consider a problem about consistency of the beams in a frequency domain, particularly the problem of main lobe width inconsistency of the beams at each frequency point. A main lobe of a wideband beam is wide in low-frequency part and narrow in high-frequency part. If a normalization constraint condition in Formula (9) is simultaneously met, that is, the signals in the expected direction are ensured to be distortionless, high-frequency energy of the signals may be greatly attenuated, which causes signal distortion. Therefore, after beam forming, there is a postprocessing process in the embodiment. Along with increase of the frequency, weight coefficients of the beams are multiplied with a progressively decreased weight factor, as shown in Formula (15), to compensate attenuation of high-frequency parts, thereby achieving the purpose of high-frequency boosting.

$$Y(f)=Y(f)\times(1+f/f_s\cdot\beta) \quad (15)$$

In an embodiment of the present disclosure, different enhancement or attenuation processing is performed for different frequency points to create a more comfortable subjective auditory feeling. For example, at a low frequency, the main lodes of the beams are very wide and the low-frequency signals are hardly attenuated, so that enhancement may be eliminated. After the frequency is higher than a certain value, the signals start to be attenuated, and along with increase of the frequency, gains of the beams are amplified to different extents, as shown in Formula (16).

$$Y(f) = \begin{cases} Y(f), & 0 < f < f_1 \\ Y(f) \times (1 + f/f_s \cdot \beta_1), & f_1 \leq f < f_2 \\ Y(f) \times (1 + f/f_s \cdot \beta_2), & f_2 \leq f < f_s/2 \end{cases} \quad (16)$$

where $f_1=f_s/8$, $f_2=f_s/4$, $\beta_1$ and $\beta_2$ are different amplification factors, and in the embodiment, $\beta_1=2.8$ and $\beta_2=2$.

The gain has different directly proportional relationships with the frequency-domain value within different preset frequency-domain value ranges.

At act 104, inverse transform of STFT is performed on the gained audio signal, output after beam forming in the output direction, of each frequency point to acquire time-domain sound signals.

Compared with a related signal processing technology, adopting the method of the embodiments of the present disclosure has the advantages that the frequency-domain-based wideband beam forming algorithm effectively improves the gain of the received speech, the manner of adaptively selecting the optimal beam is adopted to avoid provision of the prior information such as the arrival direction of the expected signal, reduce algorithm complexity and widen the application range of the algorithm. The adopted frequency-domain beam forming algorithm is favorable for fine regulation of the signal spectrum, and is conveniently integrated with other pre-processing or post-processing algorithms, a post-processing algorithm of adjusting gains of the frequency points is adopted to improve the problem of sound quality reduction during wideband speech signal processing, and in addition, the technical solution provided by the embodiments of the present disclosure is easy to implement, small in calculation amount and applicable to various embedded platforms.

Some embodiments of the present disclosure provide a signal processing device.

First Embodiment

Referring to FIG. 5, FIG. 5 is a schematic diagram of function modules of a signal processing device according to a first embodiment of the present disclosure.

In the first embodiment, the device includes:

an acquisition and time-frequency transform unit 601, arranged to acquire at least two channel sound signals, and perform STFT on each channel sound signal to acquire a frequency-domain audio signal corresponding to each channel sound signal.

Specifically, sound signals of N microphones (N>=2) are acquired, and STFT is performed on the time-domain signal received by each microphone to obtain data of each frequency point of the signal received by the microphone.

STFT may be performed on the signal of each microphone by adopting the same framing method. Frames may be partially superimposed. There are multiple superimposition manners, for example, a manner of ¼ frame shift is adopted for framing in the embodiment, and of course, another manner such as ½ frame shift may also be adopted. The frame signal $s_n(i)$ of the nth microphone is multiplied by a window function w(i), for example, a hamming window being used in the embodiment, to obtain a widowed frame signal $x_n(i)$. Then, STFT is performed on the windowed frame signal to obtain frequency-domain frame data, i.e.:

$$X_n(f)=\mathit{fft}(x_n(i)) \quad (1)$$

where i=1, . . . , L, L is a length of the frame data and f is a frequency point.

A first acquisition unit 602 is arranged to acquire beam forming output signals of a beam group corresponding to an audio signal of each frequency point according to preset weight vectors of multiple directions and the frequency-domain audio signal corresponding to each channel sound signal.

Specifically, a beam group is designed, including M beams pointing to M directions respectively: $\theta_1, \theta_2, \ldots, \theta_M$, and beam forming is performed on each beam by virtue of all array elements in a microphone array. Main lobes of adjacent beams are intersected, and the main lobes of the beam group cover a required spatial range. Therefore, no matter which direction a sound source comes from, there is a certain beam with a direction close to the direction of the sound source.

Corresponding frequency-domain frame data after formation of the M beams is obtained according to weight vectors of the M different directions. A specific method as follows may be adopted. For a specific direction $\theta_m$ in the M different directions, weighted summation is performed on received data of each microphone in the microphone array at the same frequency point f to obtain weighted synthetic data $Y_m(f)$ of the mth beam at the frequency point by virtue of the preset weight vectors of the M different directions:

$$Y_m(f) = \sum_{n=1}^{N} W_{m,n}^*(f)X_n(f) = W_m^H X \quad (2)$$

where $W_{m,n}(f)$ is a weight applied to the data received by the nth microphone in the mth beam at the frequency point f, m=1, . . . , M, * represents conjugation, H represents conjugate transpose, and X and $W_m$ are vector representation forms of $X_n(f)$ and $W_{m,n}(f)$ respectively.

In an embodiment of the present disclosure, the first acquisition unit 602 is arranged to:

according to the preset weight vectors of the multiple directions, select frequency-domain audio signals corresponding to all or part of the at least two channel sound signals and acquire the beam forming output signals of the beam group corresponding to the audio signal of each frequency point.

Specifically, due to influence of a topological structure of the microphone array, a beam forming effect achieved by virtue of part of subarrays in the microphone array may be very close to a beam forming effect achieved by virtue of all the array elements. The same performance effect may be achieved by a relatively small calculation amount. As shown in FIG. 2, FIG. 2 is a schematic diagram of a beam forming method according to an embodiment of the present disclosure. A round microphone array formed by 8 directional microphones is shown. In the embodiment, the microphone closest to a direction of an expected signal and adjacent microphones of this microphone may be selected to form a subarray for beam forming. For example, the expected signal is a beam in a 45-degree direction, and the microphone 2 dead against the 45-degree direction and adjacent microphones of this microphone 1 and 3 may be selected to form a subarray for beam forming.

A beam group is designed, including 8 beams pointing to 8 directions respectively: 0 degree, 45 degrees, 90 degrees, 135 degrees, 180 degrees, 225 degrees, 270 degrees and 315 degrees. Main lobes of adjacent beams are intersected, and the main lobes of the all the beams are superimposed to cover a range of 360 degrees. Therefore, no matter which direction a sound source comes from, there is a certain beam with a direction close to the direction of the sound source.

A second acquisition unit 603 is arranged to acquire an output direction of the beam group according to beam energy of different frequency points in same directions.

In an embodiment of the present disclosure, the second acquisition unit 603 is arranged to:

summate the beam energy of different frequency points in the same directions, and select a direction with maximum beam energy as the output direction.

Specifically, an implementation flow is shown in FIG. 3. Energy of the M pieces of frequency-domain frame data is calculated by virtue of the weighted synthetic data $Y_m(f)$ obtained by the first acquisition unit 602 respectively. A calculation formula is as follows.

$$E_m = \sum_{f=f_s/L}^{f_s/2} Y_m(f) \times Y_m^H(f) \tag{3}$$

where $f_s$ is a sampling rate, and then the beam with a maximum energy value $E_m$ is selected as a final beam forming result. Therefore, the beam closest to the direction of the sound source is adaptively selected to achieve optimal sound quality.

In an embodiment of the present disclosure, the second acquisition unit 603 is further arranged to:

summate the beam energy of all frequency points between a preset first frequency and a preset second frequency in the same directions, and select the direction with the maximum beam energy as the output direction.

Specifically, for reducing the calculation amount and maintaining selection accuracy, an optimal output beam may be selected according to an energy sum of part of the frequency points. A specific implementation flow is shown in FIG. 3. Energy sums of the frequency-domain frame data corresponding to the M directions are calculated by virtue of the weighted synthetic data $Y_m(f)$ obtained by the first acquisition unit 602 respectively. A calculation formula is as follows.

$$E_m = \sum_{f=f_1}^{f_2} Y_m(f) \times Y_m^H(f) \tag{4}$$

where $0<f_1<f_2<f_s/2$, and for example, when a Fast Fourier Transform (FFT) length L is 256, $f_1=f_s/8$ and $f_2=f_s/2$. An energy sum from frequency points $f_1$ to $f_2$ is calculated here. Then, the beam with the maximum energy value E is selected as the final beam forming result. Adopting the manner may avoid low-frequency signal distortion.

The preset weight vectors of the multiple directions may be obtained based on a DSBF algorithm, a linearly constrained minimum variance beam forming algorithm, a GSC beam forming algorithm or an MVDR method.

Specifically, detailed descriptions are made in the embodiment with an MVDR beam forming filter as an example.

The MVDR method is to minimize power of the output signals to obtain an estimate about an optimal beam former weight vector. Power spectral densities of the output signals are as follows.

$$\Phi_{YY} = W^H \Phi_{XX} W \tag{5}$$

where $\Phi_{xx}$ represents a power spectral density matrix of the input signals of the array.

In an optimization process, it is suggested to ensure that the signals in the expected direction are distortionless, that is:

$$W^H d = 1 \tag{6}$$

where d represents attenuation and delay caused by signal propagation, and is calculated as follows.

$$d = [\alpha_0 e^{-j\Omega\tau_0}, \alpha_1 e^{-j\Omega\tau_1}, \ldots, \alpha_N e^{-j\Omega\tau_N}] \tag{7}$$

If a far field model is used, amplitude differences of the signal received by each array element may be neglected, attenuation factors $\alpha_n$ are all set to be 1, $\Omega$ is an angular frequency and $\tau_n$ is a time difference between two array elements in the space:

$$\tau_n = \frac{fs}{c} \times (l_{x,n}\cos(\theta)\sin(\varphi) + l_{y,n}\sin(\theta)\sin(\varphi) + l_{z,n}\cos(\varphi)) \tag{8}$$

where $f_s$ is a signal sampling rate, c is a sound velocity 340 m/s, $l_{x,n}$ is a component of a spacing distance between the nth array element and a reference array element in a direction of an x axis, $l_{y,n}$ is a component in a direction of a y axis, $l_{z,n}$ is a component in a direction of a z axis, $\theta$ is an included angle between a projection of an incident signal in an xy plane and the x axis, and $\varphi$ is an included angle between the incident signal and the z axis. FIG. 4 is a schematic diagram of an L-shaped three-dimensional spatial microphone array according to an embodiment of the present disclosure. Formula (4) is applicable to a microphone array of any topological structure.

Then, the beam former is converted into a problem of resolving constrained optimization:

$$\min_W W^H \Phi_{XX} W \text{ s.t. } W^H d = 1 \tag{9}$$

Since only optimal noise suppression is concerned, if the direction of the expected signal is completely consistent with the direction of the array, an MVDR filter may be obtained only by virtue of a power spectral density matrix of noise:

$$W_{MVDR} = \frac{\Phi_{VV}^{-1} d}{d^H \Phi_{VV}^{-1} d} \tag{10}$$

where $\Phi_{vv}$ is the power spectral density matrix of the noise. If the matrix is a coherent matrix, a super-directional beam former is the frequency-domain weight vector used in the first acquisition unit 602:

$$W_{MVDR} = \frac{\Gamma_{vv}^{-1} \times d}{d^H \times \Gamma_{vv}^{-1} \times d} \quad (11)$$

$\Gamma_{vv}$ is a coherent function matrix of the noise. Elements in the pth row and the qth column are calculated by the following formula:

$$\Gamma V_p V_q(e^{j\Omega}) = \sin c(\Omega \times f_s \times l_{pq}/c) \quad (12)$$

where $l_{pq}$ is a spacing distance between array elements p and q.

An inverse transform unit 604 is arranged to acquire time-domain sound signals output after beam forming in the output direction.

Specifically, inverse STFT is performed on the weighted synthetic frame data Y(f) of all the frequency points f to obtain weighted time-domain frame data y(i), i=1, ..., L. Then, windowing and superimposition processing is performed on the time-domain frame data to obtain final time-domain data.

A window function is applied to an inverse STFT result to obtain an intermediate result:

$$y'(i) = y(i) \cdot w(i), 1 \leq i \leq L \quad (13)$$

Due to adoption of ¼ frame shift, it is suggested to perform superimposition processing on data of 4 frames. Signals of frames j-3, j-2, j-1 and j to which results calculated by the above formula belong are superimposed to obtain a time-domain signal $z_j(i)$ of the jth frame (the length is L/4):

$$z_j(i) = y'_{j-3}(i+3 \cdot L/4) + y'_{j-2}(i+L/2) + y'_{j-1}(i+L/4) + y'_j(i), \quad 1 \leq i \leq L/4 \quad (14)$$

According to the embodiment of the present disclosure, the at least two channel sound signals are acquired, and STFT is performed on each channel sound signal to acquire the frequency-domain audio signal corresponding to each channel sound signal; the beam forming output signals of the beam group corresponding to the audio signal of each frequency point are acquired according to the preset weight vectors of the multiple directions and the frequency-domain audio signal corresponding to each channel sound signal; the output direction of the beam group is acquired according to the beam energy of different frequency points in the same directions; and the time-domain sound signals output after beam forming in the output direction are acquired. In the present disclosure, a frequency-domain-based wideband beam forming algorithm is adopted to effectively improve a gain of a received speech, a manner of adaptively selecting an optimal beam is adopted to avoid provision of prior information such as an arrival direction of an expected signal, reduce algorithm complexity and widen an application range of the algorithm. The adopted frequency-domain beam forming algorithm is favorable for fine regulation of a signal spectrum, and is conveniently integrated with other pre-processing or post-processing algorithms, and in addition, the present disclosure is easy to implement, small in calculation amount and applicable to various embedded platforms.

Second Embodiment

Figure 7:
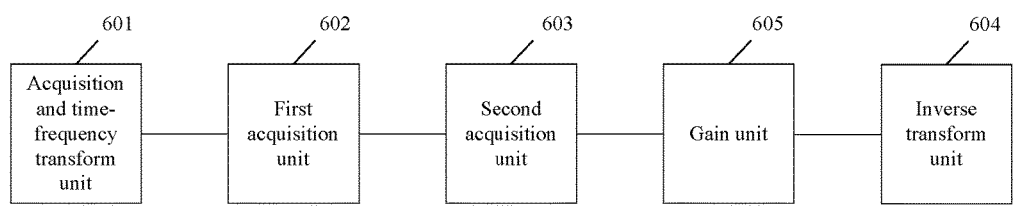
FIG. 7 is a schematic diagram of function modules of a signal processing device according to a second embodiment of the present disclosure.

Referring to FIG. 7, FIG. 7 is a schematic diagram of function modules of a signal processing device according to a second embodiment of the present disclosure.

On the basis of the first embodiment, a gain unit 605 is further included.

The gain unit 605 is arranged to multiply an audio signal, output after beam forming in the output direction, of each frequency point by a gain, the gain having a directly proportional relationship with a frequency-domain value.

Specifically, in wideband beams, it is also necessary to consider a problem about consistency of the beams in a frequency domain, particularly the problem of main lobe width inconsistency of the beams at each frequency point. A main lobe of a wideband beam is wide in low-frequency part and narrow in high-frequency part. If a normalization constraint condition in Formula (9) is simultaneously met, that is, the signals in the expected direction are ensured to be distortionless, high-frequency energy of the signals may be greatly attenuated, which causes signal distortion. Therefore, after beam forming, there is a postprocessing process in the embodiment. Along with increase of the frequency, weight coefficients of the beams are multiplied with a progressively decreased weight factor, as shown in Formula (15), to compensate attenuation of high-frequency parts, thereby achieving the purpose of high-frequency boosting.

$$Y(f) = Y(f) \times (1 + f/f_s \cdot \beta) \quad (15)$$

In an embodiment of the present disclosure, different enhancement or attenuation processing is performed for different frequency points to create a more comfortable subjective auditory feeling. For example, at a low frequency, the main lodes of the beams are very wide and the low-frequency signals are hardly attenuated, so that enhancement may be eliminated. After the frequency is higher than a certain value, the signals start to be attenuated, and along with increase of the frequency, gains of the beams are amplified to different extents, as shown in Formula (16)

$$Y(f) = \begin{cases} Y(f), & 0 < f < f_1 \\ Y(f) \times (1 + f/f_s \cdot \beta_1), & f_1 \leq f < f_2 \\ Y(f) \times (1 + f/f_s \cdot \beta_2), & f_2 \leq f < f_s/2 \end{cases} \quad (16)$$

where $f_1 = f_s/8$, $f_2 = f_s/4$, $\beta_1$ and $\beta_2$ are different amplification factors, and in the embodiment, $\beta_1 = 2.8$ and $\beta_2 = 2$.

The gain has different directly proportional relationships with the frequency-domain value within different preset frequency-domain value ranges.

Compared with a related signal processing technology, adopting the method of the embodiment of the present disclosure has the advantages that the frequency-domain-based wideband beam forming algorithm effectively improves the gain of the received speech, the manner of adaptively selecting the optimal beam is adopted to avoid provision of the prior information such as the arrival direction of the expected signal, reduce algorithm complexity and widen the application range of the algorithm. The adopted frequency-domain beam forming algorithm is favorable for fine regulation of the signal spectrum, and is conveniently integrated with other pre-processing or post-processing algorithms, a post-processing algorithm of adjusting gains of the frequency points is adopted to improve the problem of sound quality reduction during wideband speech signal processing, and in addition, the technical solution provided by the embodiment of the present disclosure is easy to implement, small in calculation amount and applicable to various embedded platforms.

The above is only the exemplary embodiments of the present disclosure and is not intended to limit the scope of patent of the present disclosure. All equivalent structures or equivalent flow transformations made by virtue of the contents of the specification and drawings of the present disclosure or direct or indirect application of the contents to other related technical fields shall fall within the scope of patent protection defined by the appended claims of the present disclosure.

INDUSTRIAL APPLICABILITY

Based on the technical solutions provided by the embodiments of the present disclosure, the at least two channel sound signals are acquired, and STFT is performed on each channel sound signal to acquire the frequency-domain audio signal corresponding to each channel sound signal; the beam forming output signals of the beam group corresponding to the audio signal of each frequency point are acquired according to the preset weight vectors of the multiple directions and the frequency-domain audio signal corresponding to each channel sound signal; the output direction of the beam group is acquired according to the beam energy of different frequency points in the same directions; and the time-domain sound signals output after beam forming in the output direction are acquired. In the embodiments of the present disclosure, the frequency-domain-based wideband beam forming algorithm is adopted to effectively improve the gain of the received speech, the manner of adaptively selecting the optimal beam is adopted to avoid provision of the prior information such as the arrival direction of the expected signal, reduce algorithm complexity and widen the application range of the algorithm. The adopted frequency-domain beam forming algorithm is favorable for fine regulation of the signal specatrum, and is conveniently integrated with the other pre-processing or post-processing algorithms, and in addition, the technical solution provided by the embodiments of the present disclosure is easy to implement, small in calculation amount and applicable to various embedded platforms.

What is claimed is:

1. A signal processing method, comprising:
acquiring at least two channel sound signals, and performing Short-Time Fourier Transform (STFT) on each channel sound signal to acquire a frequency-domain audio signal corresponding to each channel sound signal;
acquiring beam forming output signals of a beam group corresponding to an audio signal of each frequency point according to preset weight vectors of multiple directions and the frequency-domain audio signal corresponding to each channel sound signal;
acquiring an output direction of the beam group according to beam energy of the Beam forming output signals of different frequency points in same directions; and
acquiring time-domain sound signals output after beam forming in the output direction;
wherein acquiring the beam forming output signals of the beam group corresponding to the audio signal of each frequency point according to the preset weight vectors of the multiple directions and the frequency-domain audio signal corresponding to each channel sound signal comprises: according to the preset weight vectors of the multiple directions, selecting frequency-domain audio signals corresponding to all or part of the at least two channel sound signals and acquiring the beam forming output signals of the beam group corresponding to the audio signal of each frequency point;
wherein according to the preset weight vectors of the multiple directions, selecting the frequency-domain audio signals corresponding to all or part of the at least two channel sound signals and acquiring the beam forming output signals of the beam group corresponding to the audio signal of each frequency point comprises:
for a specific direction $\theta_m$ in M different directions, performing weighted summation on received data of each microphone in a microphone array at the same frequency point f to obtain weighted synthetic data $Y_m(f)$ of an mth beam at the frequency point by virtue of the preset weight vectors of the M different directions:

$$Y_m(f) = \sum_{n=1}^{N} W_{m,n}^*(f) X_n(f) = W_m^H X$$

where $W_{m,n}(f)$ is a weight applied to data received by an nth microphone in the mth beam at the frequency point f, m=1, $\Lambda$, M, * represents conjugation, H represents conjugate transpose, $X_n(f)=\text{fft}(x_n(i))$, where $x_n(i)$ is a widowed frame signal, i=1, L, L, L is a length of the frame data, and X and $W_m$ are vector representation forms of $X_n(f)$ and $W_{m,n}(f)$ respectively.

2. The method as claimed in claim 1, wherein acquiring the output direction of the beam group according to the beam energy of different frequency points in the same directions comprises:
summating the beam energy of different frequency points in the same directions, and selecting a direction with maximum beam energy as the output direction.

3. The method as claimed in claim 2, wherein summating the beam energy of different frequency points in the same directions and selecting the direction with the maximum beam energy as the output direction comprises:
summating the beam energy of all frequency points between a preset first frequency and a preset second frequency in the same directions, and selecting the direction with the maximum beam energy as the output direction.

4. The method as claimed in claim 3, wherein summating the beam energy of all frequency points between the preset first frequency and the preset second frequency in the same directions comprises:
calculating energy sums $E_m$ of frequency-domain frame data corresponding to M directions by virtue of weighted synthetic data $Y_m(f)$ respectively based on the following formula:

$$E_m = \sum_{f=f_1}^{f_2} Y_m(f) \times Y_m^H(f)$$

where $0<f_1<f_2<f_s/2$, $f_s$ is a sampling rate, and H represents conjugate transpose.

5. The method as claimed in claim 2, wherein summating the beam energy of different frequency points in the same directions comprises:
calculating energy $E_m$ of M pieces of frequency-domain frame data by virtue of weighted synthetic data $Y_m(f)$ based on the following formula:

$$E_m = \sum_{f=f_s/L}^{f_s/2} Y_m(f) \times Y_m^H(f)$$

where $f_s$ is a sampling rate, L is a length of the frame data, and H represents conjugate transpose.

6. The method as claimed in claim 1, wherein the preset weight vectors of the multiple directions are obtained based on a Delay and Sum Beam Forming (DSBF) algorithm, a linearly constrained minimum variance beam forming algorithm, a Generalized Sidelobe Canceller (GSC) beam forming algorithm or a Minimum Variance Distortionless Response (MVDR) method.

7. The method as claimed in claim 1, after acquiring the output direction of the beam group according to the beam energy of different frequency points in the same directions, further comprising:
   multiplying an audio signal, output after beam forming in the output direction, of each frequency point by a gain, wherein the gain has a directly proportional relationship with a frequency-domain value.

8. The method as claimed in claim 7, wherein the gain has different directly proportional relationships with the frequency-domain value within different preset frequency-domain value ranges.

9. The method as claimed in claim 1, wherein acquiring time-domain sound signals output after beam forming in the output direction comprises:
   performing inverse STFT on weighted synthetic frame data Y(f) of all frequency points f to obtain weighted time-domain frame data y(i), where i=1, L, L;
   performing windowing and superimposition processing on the time-domain frame data to obtain final time-domain data, wherein
   a window function is applied to an inverse STFT result to obtain an intermediate result: y'(i)=y(i)·w(i), 1≤i≤L;
   signals of frames j-3, j-2, j-1 and j to which results calculated by the above formula belong are superimposed to obtain a time-domain signal $z_j(i)$ of the jth frame:

$z_j(i)=y'_{j-3}(i+3·L/4)+y'_{j-2}(i+L/2)+y'_{j-1}(i+L/4)+y'_j(i)$,
   1≤i≤L/4 where w(i) is a window function.

10. The method as claimed in claim 7, wherein multiplying the audio signal, output after beam forming in the output direction, of each frequency point by the gain comprises:
    along with increase of frequency, multiplying weight coefficients of beams with a progressively decreased weight factor based on the following formula:

$Y(f)=Y(f)\times(1-f/f_s\cdot\beta)$.

11. The method as claimed in claim 10, wherein along with increase of the frequency, gains of the beams are amplified to different extents based on the following formula:

$$Y(f) = \begin{cases} Y(f), & 0 < f < f_1 \\ Y(f)\times(1+f/f_s\cdot\beta_1), & f_1 \le f < f_2 \\ Y(f)\times(1+f/f_s\cdot\beta_2), & f_2 \le f < f_s/2 \end{cases}$$

where $f_1=f_s/8$, $f_2=f_s/4$, $\beta_1$ and $\beta_2$ are different amplification factors.

12. A signal processing device, comprising a hardware processor arranged to execute program units comprising:
    an acquisition and time-frequency transform unit, arranged to acquire at least two channel sound signals, and perform Short-Time Fourier Transform (STFT) on each channel sound signal to acquire a frequency-domain audio signal corresponding to each channel sound signal;
    a first acquisition unit, arranged to acquire beam forming output signals of a beam group corresponding to an audio signal of each frequency point according to preset weight vectors of multiple directions and the frequency-domain audio signal corresponding to each channel sound signal;
    a second acquisition unit, arranged to acquire an output direction of the beam group according to beam energy of the Beam forming output signals of different frequency points in same directions; and
    an inverse transform unit, arranged to acquire time-domain sound signals output after beam forming in the output direction;
    wherein the first acquisition unit is arranged to: according to the preset weight vectors of the multiple directions, select frequency-domain audio signals corresponding to all or part of the at least two channel sound signals and acquire the beam forming output signals of the beam group corresponding to the audio signal of each frequency point;
    wherein according to the preset weight vectors of the multiple directions, selecting the frequency-domain audio signals corresponding to all or part of the at least two channel sound signals and acquiring the beam forming output signals of the beam group corresponding to the audio signal of each frequency point comprises:
    for a specific direction $\theta_m$ in M different directions, performing weighted summation on received data of each microphone in a microphone array at the same frequency point f to obtain weighted synthetic data $Y_m(f)$ of an mth beam at the frequency point by virtue of the preset weight vectors of the M different directions:

$$Y_m(f) = \sum_{n=1}^{N} W^*_{m,n}(f)X_n(f) = W_m^H X$$

where $W_{m,n}(f)$ is a weight applied to data received by an nth microphone in the mth beam at the frequency point f, m=1, Λ, M, * represents conjugation, H represents conjugate transpose, $X_n(f)$=fft($x_n(i)$), where $x_n(i)$ is a widowed frame signal, i=1, L, L, L is a length of the frame data, and X and $W_m$ are vector representation forms of $X_n(f)$ and $W_{m,n}(f)$ respectively.

13. The device as claimed in claim 12, wherein the second acquisition unit is further arranged to:
    summate the beam energy of different frequency points in the same directions, and select a direction with maximum beam energy as the output direction.

14. The device as claimed in claim 13, wherein the second acquisition unit is further arranged to:
    summate the beam energy of all frequency points between a preset first frequency and a preset second frequency in the same directions, and select the direction with the maximum beam energy as the output direction.

15. The device as claimed in claim 14, wherein the preset weight vectors of the multiple directions are obtained based on a Delay and Sum Beam Forming (DSBF) algorithm, a linearly constrained minimum variance beam forming algorithm, a Generalized Sidelobe Canceller (GSC) beam forming algorithm or a Minimum Variance Distortionless Response (MVDR) method.

16. The device as claimed in claim 12, wherein the hardware processor is arranged to execute program units comprising: a gain unit, arranged to multiply an audio signal, output after beam forming in the output direction, of each frequency point by a gain, wherein the gain has a directly proportional relationship with a frequency-domain value.

17. The device as claimed in claim 16, wherein the gain has different directly proportional relationships with the frequency-domain value within different preset frequency-domain value ranges.

* * * * *